US007870371B2

(12) United States Patent
Mutlu et al.

(10) Patent No.: US 7,870,371 B2
(45) Date of Patent: Jan. 11, 2011

(54) TARGET-FREQUENCY BASED INDIRECT JUMP PREDICTION FOR HIGH-PERFORMANCE PROCESSORS

(75) Inventors: Onur Mutlu, Kirkland, WA (US); Jose Alberto Joao, Austin, TX (US)

(73) Assignee: Microsoft Corporation, Redmond, WA (US)

( * ) Notice: Subject to any disclaimer, the term of this patent is extended or adjusted under 35 U.S.C. 154(b) by 439 days.

(21) Appl. No.: 11/957,728

(22) Filed: Dec. 17, 2007

(65) Prior Publication Data

US 2009/0158017 A1  Jun. 18, 2009

(51) Int. Cl.
*G06F 9/42* (2006.01)
(52) U.S. Cl. ............................ 712/239; 712/233
(58) Field of Classification Search .................. None
See application file for complete search history.

(56) References Cited

U.S. PATENT DOCUMENTS

| | | | | |
|---|---|---|---|---|
| 5,163,140 | A * | 11/1992 | Stiles et al. | 711/140 |
| 5,740,416 | A | 4/1998 | McMahan | |
| 5,752,069 | A | 5/1998 | Roberts et al. | |
| 5,812,839 | A | 9/1998 | Hoyt et al. | |
| 5,822,559 | A | 10/1998 | Narayan et al. | |
| 5,832,260 | A * | 11/1998 | Arora et al. | 712/239 |
| 5,848,268 | A | 12/1998 | Matsuo | |
| 5,878,255 | A | 3/1999 | Tran et al. | |
| 6,092,187 | A * | 7/2000 | Killian | 712/239 |
| 6,170,054 | B1 | 1/2001 | Poplingher | |
| 6,233,678 | B1 * | 5/2001 | Bala | 712/240 |
| 6,327,704 | B1 | 12/2001 | Mattson et al. | |
| 6,560,693 | B1 | 5/2003 | Puzak et al. | |
| 7,111,096 | B1 | 9/2006 | Banning et al. | |
| 2003/0065912 | A1 * | 4/2003 | Hum et al. | 712/239 |
| 2003/0182543 | A1 * | 9/2003 | Keller et al. | 712/237 |
| 2005/0262332 | A1 * | 11/2005 | Rappoport et al. | 712/239 |
| 2006/0190924 | A1 * | 8/2006 | Bruening et al. | 717/104 |

OTHER PUBLICATIONS

Hao, E., etal., Increasing the Instruction Fetch Rate via Block Structured Instruction Set Architectures, Intl. Journal of Parallel Programming, Plenum Publishing Corp., vol. 26, No. 4, pp. 449-478.*

(Continued)

*Primary Examiner*—Eric Coleman
(74) *Attorney, Agent, or Firm*—Turocy & Watson, LLP

(57) ABSTRACT

A frequency-based prediction of indirect jumps executing in a computing environment is provided. Illustratively, a computing environment comprises a prediction engine that processes data representative of indirect jumps performed by the exemplary computing environment according to a selected frequency-based prediction paradigm. Operatively, the exemplary prediction engine can keep track of targets, in a table, taken for each indirect jump and program context (e.g., branch history and/or path information) of an exemplary computing program. Further, the prediction engine can also store a frequency counter associated with each target in the exemplary table. Illustratively, the frequency counter can record the number of times a target was taken in the recent past executions of an observed one or more indirect jump. The prediction engine can supply the target address of an indirect jump based on the values of the frequency counters of each stored target address.

20 Claims, 8 Drawing Sheets

OTHER PUBLICATIONS

Chang, Po-Yung etal., Target Prediction for Indirect Jumps, 1997, ACM, pp. 274-283.*

McFarling, Scott, Combining Branch Predictors, Jun. 1993, Digital Western research Laboratory, 22 pages.*

Brad Calder, et al. Fast & Accurate Instruction Fetch and Branch Prediction. 1994 Intl. Symp. on Computer Architecture, Chicago, Il. Apr. 1994. http://www.cs.ucsd.edu/~calder/papers/ISCA-94.pdf. Last accessed Oct. 1, 2007, 10 pages.

Marat Boshernitsan, et al. ROE: Runtime Optimization Environment, Dec. 12, 1998. http://66.102.1.104/scholar?hl=en&lr=&q=cache: EVXe1d1OoVYJ:www.cs.berkeley.edu/~efros/projects/cs252.ps.gz. Last accessed Oct. 1, 2007, 27 pages.

Karel Driesen. Efficient Polymorphia Calls http://www.cs.mcgill.ca/~karel/efficient.polymorphic.calls.pdf. Last accessed Oct. 1, 2007, 231 pages.

Brad Calder, et al. Reducing Indirect Function Call Overhead in C++ Programs. ACM Principles and Practice of Programming Languages, Portland, Oregon 1994. http://www/cs/ucsd.edu/~calder/papers/POPL-94.pdf. Last accessed Oct. 1, 2007, 11 pages.

* cited by examiner

TARGET-FREQUENCY BASED INDIRECT JUMP PREDICTION FOR HIGH-PERFORMANCE PROCESSORS

BACKGROUND

Modern processors use relatively long pipelines (e.g., 10-30 stages) to execute instructions. Generally, to keep its pipeline full, a pipelined processor needs to know the next instruction that comes after an indirect jump (e.g., an indirect jump instruction can be operative to change a computing application's control flow to a location designated in its argument, which could be a register or memory location) right after it fetches the indirect jump instruction. Unfortunately, the correct target address of an indirect jump is not known until the indirect jump is executed. It could take tens of cycles to execute the indirect jump after it is fetched. Therefore, to keep its pipeline full, a pipelined processor needs to predict the next instruction that comes after the indirect jump instruction right after the indirect jump is fetched. In other words, when the indirect jump is fetched into the pipeline, the processor needs to predict the target address of the indirect jump instruction. This prediction is not trivial because an indirect jump instruction can have multiple possible target addresses.

For example, a virtual function call that is implemented as an indirect jump instruction can be overridden in many (tens or hundreds of) derived classes. Each of these overriding functions constitutes a possible target address for the indirect jump instruction that implements the virtual function call (and the correct target address is not known when the indirect jump is fetched).

Current practices deploy several mechanisms for predicting the target address of an indirect jump. For example, current pipelined processors use the branch target buffer (BTB) to predict the target of an indirect jump instruction. A BTB is a table that stores information about all taken branches and jumps. This table is organized as a cache and is indexed using the jump address (or some part of it). A standard BTB stores the last seen target of each indirect jump. Therefore, unless the jump only exercises a single target (mono-morphic jump), a BTB-based predictor mis-predicts a jump every time the jump's actual target is different from the last seen target. Alternative implementations of the BTB have been proposed to improve the target prediction accuracy for indirect jumps, with a counter that enables updating the stored target only after a few consecutive mis-predictions. However, the accuracy of a BTB-based predictor can be limited since: (1) only the most recent target can be predicted, (2) only one entry is stored per indirect jump, without any context (history or control-flow path information leading to the jump), (3) the BTB is a set-associative cache and therefore it has compulsory, capacity and conflict misses, and (4) there could be interference between different taken branches and indirect jumps if the BTB is partially tagged to reduce its storage requirements.

Other practices deploy one or more target caches in predicting indirect jumps performed by microprocessors. With current practices, target caches overcome some of the limitations of the BTB by using the principles of two-level branch predictors—i.e., they use branch history information to distinguish between different dynamic instances of an indirect jump. A table named target cache is accessed with a hashing function of the jump address (called the program counter (PC)) and the global branch history register (GHR), for example the XOR function of PC and GHR. Each entry in the target cache contains the last seen target for that particular combination of PC and GHR. The target cache can be tagged or tagless. Larger target caches have better prediction accuracy if they are tagged, because tag matching eliminates interference among different indirect jumps. The target cache can be accessed with different hashing functions involving the jump address (a static value) and some information about the context of the particular dynamic instance of the jump. Usually the context is defined with either branch history or path history or a combination of both.

Another current solution utilizes cascaded predictors which are hybrid predictors that dynamically classify indirect jumps into easy and hard to predict and use different tables with different hardware budgets for each class of jumps. For example, the easy-to-predict jumps can be predicted by the BTB without creating an entry in a more sophisticated table. The underlying idea of the cascaded predictors is that the hybrid predictor can achieve higher accuracy than a monolithic target cache, even with smaller total storage requirements. Multi-stage cascaded predictors further extend this idea by using several tables of increasing complexity (longer branch or path history). Each stage is basically similar to a tagless or tagged target cache, but the update rules (i.e., the rule of not creating an entry in a table unless the jump was mispredicted by all previous tables/stages) allow a more efficient use of the available total storage. A 3-stage cascaded predictor conveniently sized outperforms other configurations and gets most of the benefit of a larger number of stages.

Further, indirect jump prediction can be accomplished by data compression which operatively uses prediction by partial matching (PPM) with a set of Markov predictors of decreasing size, indexed by the result of hashing a decreasing number of bits from previous targets. The Markov predictor is a set of tables where each table entry contains a single target address and bookkeeping bits. The prediction comes from the highest order table that can predict, similarly to a cascaded predictor. The PPM predictor requires significant hardware complexity in the indexing functions, Markov tables and logic to select the predicted target.

Also, current solutions employ indirect target tagged geometric history length (ITTAGE) predictor which operatively uses a set of tables indexed with history lengths that increase according to a geometric progression. The predicted target comes from the table indexed with the longest history that can make a prediction i.e., the table with the longest history that has an entry for that particular indirect jump and branch history. Complex update rules try to create an entry in a table indexed with a longer history only if the less complex tables are unable to predict correctly. Additionally, a usefulness counter and a confidence bit are used to minimize the perturbation introduced by a single occurrence of a jump target.

The virtual program counter (VPC) predictor is a recently proposed predictor that uses the existing conditional branch prediction hardware for indirect jump target prediction. The basic idea is inspired by a compiler optimization called devirtualization, which consists of replacing an indirect call with a sequence of conditional branches testing the most likely targets of the call. The VPC predictor stores multiple targets for each jump in the BTB. The prediction is an iterative process. In each iteration, a virtual PC and a virtual branch history are used to access the conditional branch predictor. At the same time, the BTB is accessed with the virtual PC. If the prediction is "taken", the predicted target is retrieved from the BTB and the process terminates. If the prediction is "not taken", another iteration is performed in the next cycle. The maximum number of iterations is limited to 12. The virtual PC is a hash function of the actual PC and the iteration number. The update rules train the conditional branch predictor to predict "taken" for the correct target and introduce the new target replacing the least frequently used target. The main advantage of the VPC predictor is that it does not require expensive and specialized hardware for indirect jump prediction.

Previous approaches only consider a single target for each given program context (i.e., jump address, branch history, or a combination of these three properties), without any mechanism to discern among multiple targets that might have been used under the same context. Unfortunately, in object-oriented programs where indirect jumps have many target addresses, different target addresses can be taken by an indirect jump even for a given program context. Therefore, solely using program context information is not enough to distinguish between the multiple targets used within the same program context.

From the foregoing it is appreciated that there exists a need for systems and methods to ameliorate the shortcomings of existing practices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The subject matter described herein allows for a frequency-based prediction of indirect jumps executed by microprocessors operative in an exemplary computing environment. In an illustrative implementation, a computing environment comprises a prediction engine and an instruction set providing at least one instruction to the prediction engine to process data representative of indirect jumps performed by the exemplary computing environment according to a selected frequency-based prediction paradigm.

In an illustrative operation, the exemplary prediction engine can keep track of targets, in a table, taken for each indirect jump performed by the exemplary computing environment and program context (e.g., branch history and/or path information) of an exemplary computing program executing on the exemplary computing environment. Further, the prediction engine can also store a frequency counter associated with each target in the exemplary table. Illustratively, the frequency counter can record the number of times a target was taken in the recent past executions of an observed one or more indirect jump.

In the illustrative implementation, the prediction engine table can comprise one or more entries comprising data representative of, N most recent targets of the indirect jump associated with the entry, and execution frequency counter for each of the targets in the entry.

The following description and the annexed drawings set forth in detail certain illustrative aspects of the subject matter. These aspects are indicative, however, of but a few of the various ways in which the subject matter can be employed and the claimed subject matter is intended to include all such aspects and their equivalents.

DETAILED DESCRIPTION

Figure 1:
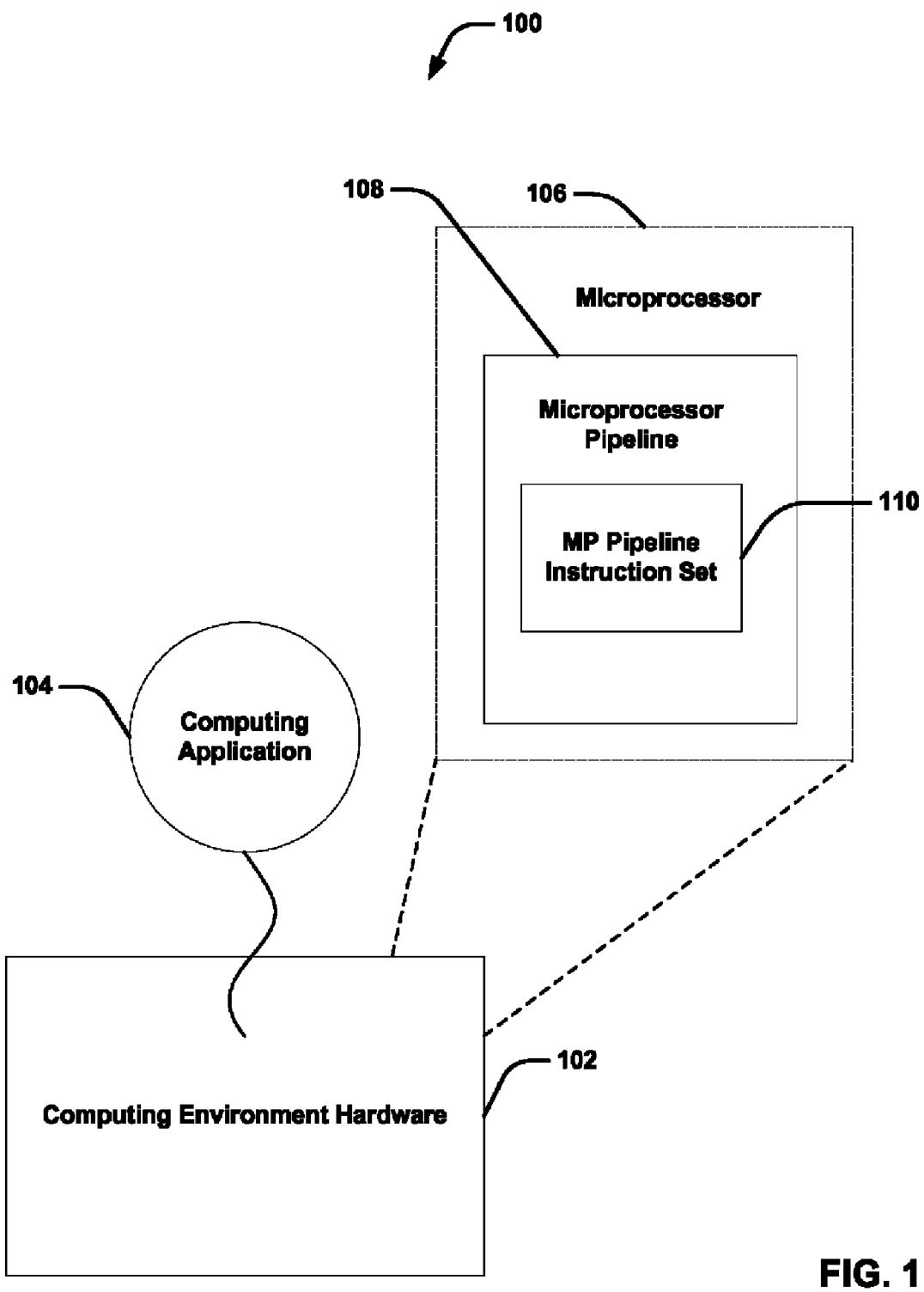
FIG. 1 is a block diagram of one example of a computing environment performing indirect jumps in accordance with the herein described systems and methods.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative illustrations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

Overview: Indirect Jumps:

The herein described systems and methods aim to ameliorate the shortcomings of existing practices by improving the performance of how a processor handles indirect jump instructions. Generally, indirect jump instructions can be found in computer programs, and especially frequently in those written in object-oriented languages such as C#, Java, and C++. In practice, to support polymorphism, these languages include virtual function calls that are implemented using indirect jump instructions in the instruction set architecture of a processor. These and other computing languages also implement common code constructs including "switch statements," "jump tables," and "interface calls" using indirect jump instructions. Specifically, an indirect jump instruction changes the program control flow to a location designated in its argument, which could be a register or memory location. Currently deployed object-oriented languages result in significantly more indirect jumps than traditional languages. In addition to virtual function calls, indirect jumps are commonly used in the implementation of programming language constructs such as switch-case statements, jump tables, and interface calls.

Current pipelined processors deploy inadequate mechanisms for predicting the target address of an indirect jump if multiple different target addresses are exercised at run-time. Such hard-to-predict indirect jumps not only limit processor performance and cause wasted energy consumption but also contribute significantly to the performance difference between traditional and object-oriented languages.

Even though several indirect jump predictors have been proposed, as described herein, improved prediction accuracy of indirect jump instructions can lead to an increase in performance in object-oriented applications and languages. The herein described systems and methods provide a new prediction mechanism for indirect jump instructions that processes information about the frequency of occurrence of target addresses of an indirect jump.

Previous approaches consider a single target for each given program context (i.e. jump address, branch history, path history), without any mechanism to discern among multiple targets that might have been used under the same context. In object-oriented programs where indirect jumps have many target addresses, different target addresses can be taken by an indirect jump even for a given program context. Solely using program context information does not render enough data to distinguish between the multiple targets used within the same program context.

The herein described systems and methods ameliorate the shortcomings of existing practices by monitoring the frequency of target address for recently executed indirect jumps. In an illustrative implementation, the herein described systems and methods illustratively, operatively, keep track of the most frequently used targets in the recent past for the same jump instruction and the same program context. Employing this collected data, a predicted target for an observed indirect jump can be derived using the most frequently executed target as the predicted target of the indirect jump instruction (when the indirect jump is fetched).

Computing Environment with Indirect Jumps:

FIG. 1 describes an exemplary computing environment 100 executing an exemplary computing application utilizing indirect jumps. As is shown in FIG. 1, exemplary computing environment 100 comprises computing environment hardware 102 executing computing application 104. Further, as is shown in FIG. 1, computing environment hardware 102 can comprise one or more microprocessor areas 106 further comprising microprocessor pipeline 108 and microprocessor pipeline instruction set 110.

In an illustrative operation, computing environment hardware 102 can execute computing application 104 which can be an object oriented computing application (or other software application) executing one or more indirect jumps on microprocessor pipeline 108. Microprocessor pipeline 108 can illustratively operate to handle the one or more indirect jumps deployed by exemplary computing application 104 according to one or more microprocessor pipeline instructions provided by microprocessor pipeline instruction set 110.

It is appreciated that although exemplary computing environment 100 is described to comprise various components for handling indirect jumps such description is merely illustrative as exemplary computing environment 100 can comprise one or more computing environment hardware to handle other features/operations performed by exemplary computing environment.

Figure 2:
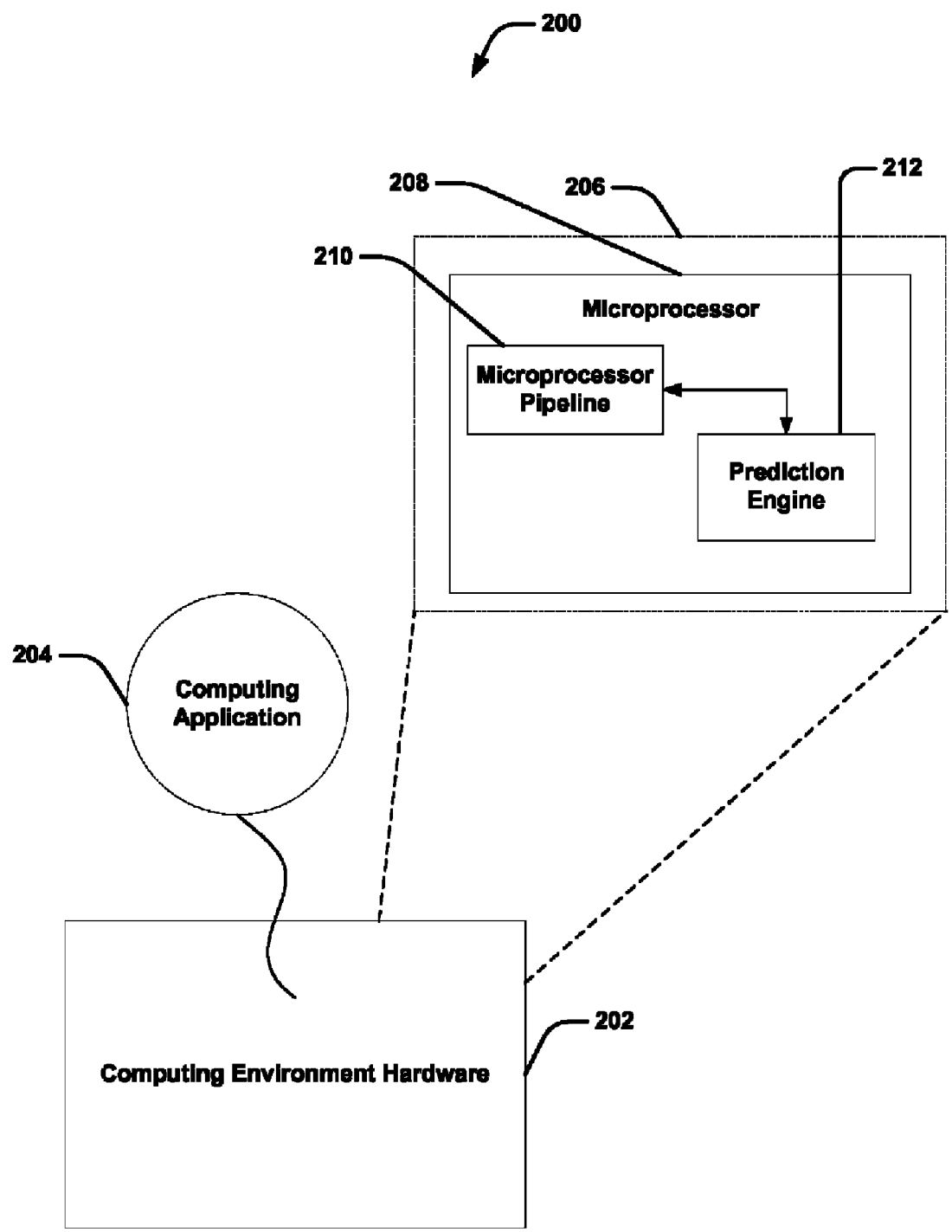
FIG. 2 is a block diagram of one example of a computing environment having indirect jump prediction capabilities in accordance with the herein described systems and methods.

FIG. 2 describes an exemplary computing environment 200 executing an exemplary computing application utilizing indirect jumps and comprising a prediction facility to predict one or more targets for an indirect jump. As is shown in FIG. 2, exemplary computing environment 200 comprises computing environment hardware 202 executing computing application 204. Further, as is shown in FIG. 2, computing environment hardware 202 can comprise processing area 206 further comprising microprocessor 208 which further comprises microprocessor pipeline 210 and prediction engine 212.

In an illustrative operation, computing environment hardware 202 can execute computing application 204 which can be an object oriented computing application (or other software application) executing one or more indirect jumps on microprocessor pipeline 210. Microprocessor pipeline 210 can illustratively operate to handle the one or more indirect jumps deployed by exemplary computing application 204 using microprocessor pipeline 210 and prediction engine 212. Further, in the illustrative operation, prediction engine 212 can process data representative of the indirect jumps executed on microprocessor pipeline 210 to provide one or more predictions of target addresses in the program to which an indirect jump will direct the program control flow.

It is appreciated that although exemplary computing environment 200 is described to comprise various components for handling indirect jumps such description is merely illustrative as exemplary computing environment 200 can comprise one or more computing environment hardware including other prediction engines to predict values to support the execution of other features/operations performed by exemplary computing environment.

Figure 3:
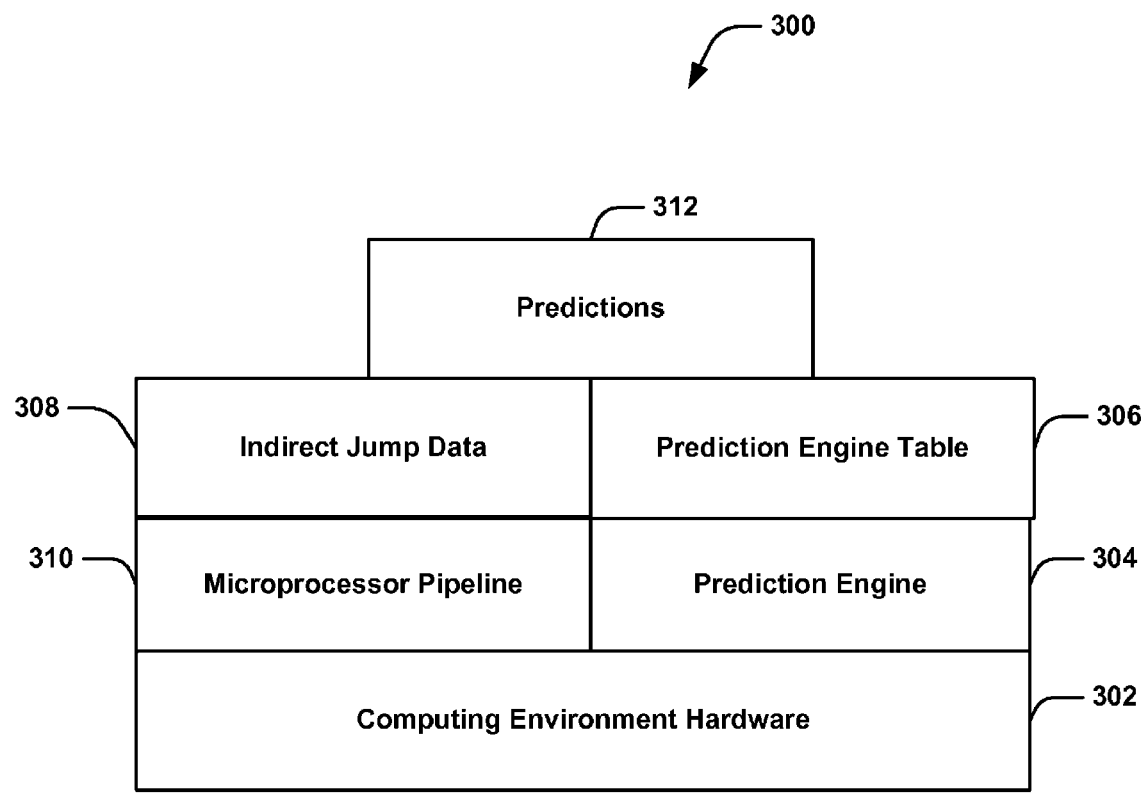
FIG. 3 is a block diagram of one example of the interaction between various components of an exemplary computing application environment having a frequency-based prediction engine to predict indirect jumps in accordance with the herein described systems and methods.

FIG. 3 describes an exemplary computing environment 300 operative to execute one or more indirect jumps. As is shown in FIG. 3, exemplary computing environment 300 comprises computing environment hardware 302, microprocessor pipeline 310, prediction engine 304, prediction engine table 306, indirect jump data 308, and predictions 312. In an illustrative implementation, prediction engine can comprise one or mechanisms cooperating with microprocessor pipeline 310 to identify the occurrence of an indirect jump and provide a prediction 312 of a target for the identified indirect jump. Further, prediction engine 304 can comprise one or more frequency counters (not shown) which operatively store the number of times an indirect jump lands at one or more observed target locations (e.g., of microprocessor portion(s) 310).

In an illustrative operation, microprocessor pipeline 310 can execute one or more indirect jumps (represented by indirect jump data 308). Cooperating with microprocessor pipeline 310, prediction engine can store frequency data for each of the indirect jump operations occurring on microprocessor pipeline 310 in prediction engine table 306. The frequency data (not shown) can then be processed by prediction engine to generate one or more predictions 312. The prediction data can be used by microprocessor pipeline 310 to fetch the next instruction into microprocessor pipeline 310.

Figure 4:
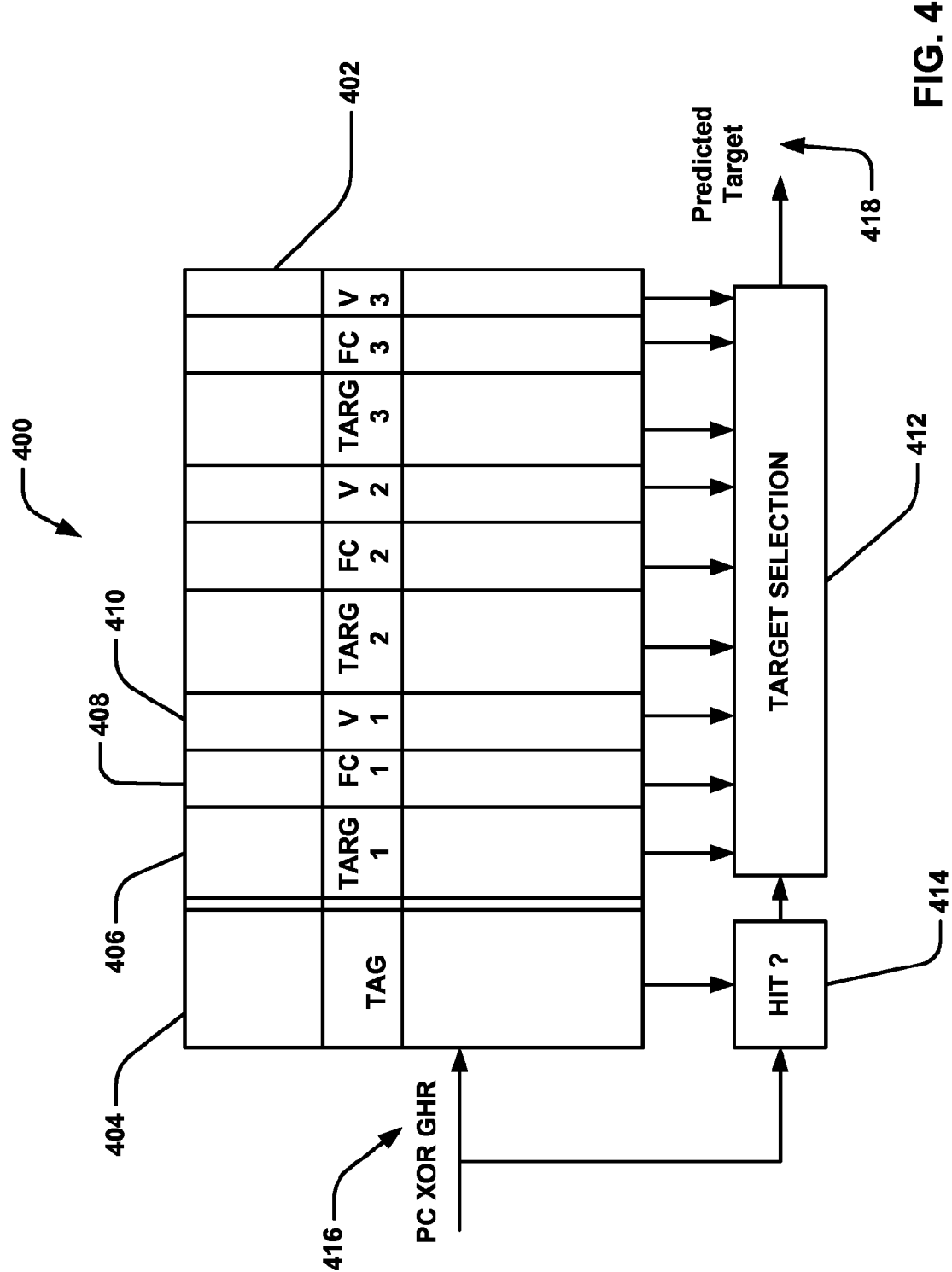
FIG. 4 is a block diagram of one example of the data flow used to populate a corresponding prediction engine table in accordance with the herein described systems and methods.

FIG. 4 schematically illustrates the interaction of exemplary components of an exemplary computing environment 400 executing indirect jumps by deploying an exemplary prediction engine table 402. In an illustrative implementation, targets and frequency counters can be stored in a computing environment hardware structure (e.g., prediction engine table) 402. In an illustrative operation, an exemplary processor (not shown) can access this table 402 when it fetches an indirect jump instruction to make a prediction 418, and when an indirect jump instruction is resolved to update the information for the correct target. Illustratively, the prediction engine table can be implemented in a variety of forms including but not limited to a set-associative cache structure, a queue, and a content addressable associative memory.

In an illustrative operation, a prediction of a target address for an executing indirect jump can be generated according to processing performed by exemplary prediction engine according to a frequency-based target address processing paradigm. In an illustrative implementation, an exemplary processor can access the prediction engine table 402 using the program counter (PC) of an indirect jump hashed with a processor state that provides information about the program context. In an illustrative implementation, the PC is XORed 416 with the global branch history register (GHR) (commonly used in modern processors to provide context information) to form an index into the prediction engine table. Alternative implementations can use other context information (e.g., such as path history, or local history registers, or any other processor register, which are implemented in various other processors). Alternative implementations can also use other hashing functions than XOR (for example, they can use shifting-and-XORing, or folding-and-XORing, addition, multiplication, division, subtraction, or any other binary or arithmetic operation).

As is shown in FIG. 4, prediction engine table 402 comprises TAG area 404 representative of the tag of the entry in which information about an indirect jump is kept. Further, prediction engine table 402 comprises data representative of a multitude (N) of targets comprising, TARGi: Target 406, FCi: Frequency Counter associated with target TARGi 408, and Vi: Valid bit 410.

In an illustrative implementation, exemplary computing environment 400 further comprises target selection mechanism 412 which illustratively operatively compares the frequency counters for valid targets in the predictor entry that is being accessed, and selects the valid target with the highest frequency counter. In the illustrative operation, if more than one frequency counter have the same highest value, the logic in target selection mechanism 412 can operate to select an arbitrary valid target, e.g. the leftmost valid target. Further, exemplary computing environment 400 comprises HIT detection mechanism 414 which operatively queries prediction engine table 402 to determine whether or not the jump address and the program context is stored in the prediction engine table. Illustratively, based on this access the following can result: a) "hit"—if there is an entry in the prediction engine table associated with the jump address and the program context, the valid target with the highest frequency counter is predicted as the target address of the jump, or b) "miss"—if there is no entry in the predictor associated with the jump address and the program context, the processor uses the baseline prediction policy, e.g. BTB-based prediction, if one exists, or stall until the indirect jump is executed.

In an illustrative operation, an exemplary prediction engine can operatively keep track of the targets taken for executing indirect jumps and program context (branch history and/or path information) in a table. The prediction engine also stores a frequency counter associated with each target in its table. The purpose of the frequency counter is to record the number of times a target was taken in the recent past executions of the indirect jump. Illustratively, the prediction engine table can comprise data representative of the N most recent targets of the indirect jump associated with the entry, and an execution frequency counter for each of the targets in the entry.

Figure 5:
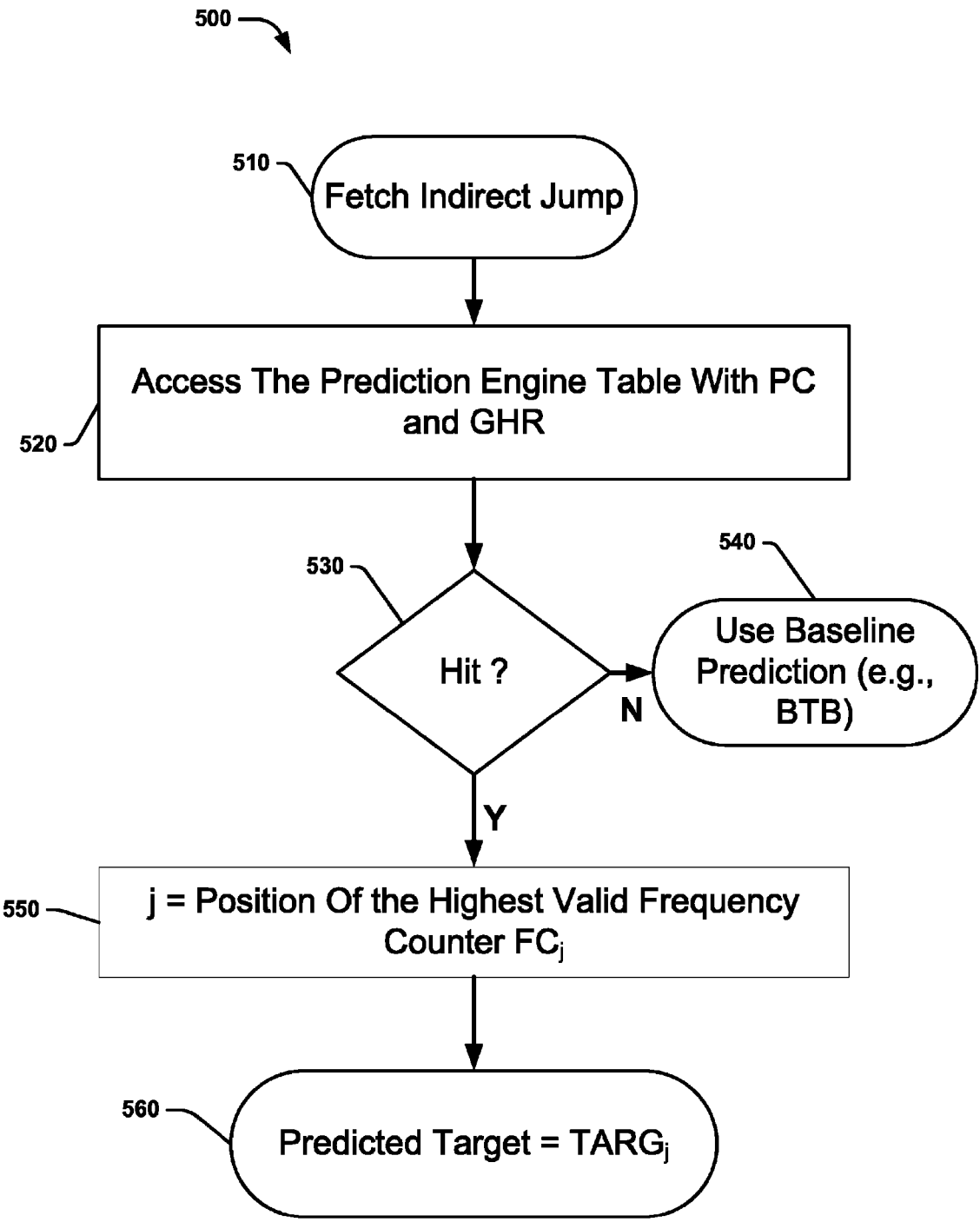
FIG. 5 is a flow diagram of one example of a method for predicting indirect jumps in accordance with the herein described systems and methods.

FIG. 5 is a flow diagram of one example of a method 500 illustratively deployed to predict the target of an indirect jump occurring in an exemplary computing environment. As is shown in FIG. 5, processing begins at block 510 where an indirect jump instruction is fetched by an exemplary prediction engine. Processing then proceeds to block 520 where the prediction engine table is accessed with PC and GHR. A check is then performed at block 530 to determine whether the prediction engine table contains information about the indirect jump to constitute a "hit." If the check at bock 530 indicates that a "hit" has not happened, processing proceeds to block 540 where another baseline prediction mechanism is deployed (e.g., BTB prediction).

However, if the check at block 530 indicates that a "hit" occurred (i.e., a valid entry was found in the prediction engine table), processing proceeds to block 550 where the position of the highest valid frequency counter (e.g., $FC_j$) is set at the target position value j. Processing proceeds to block 560 where the predicted target is represented as $TARG_j$.

Figure 6:
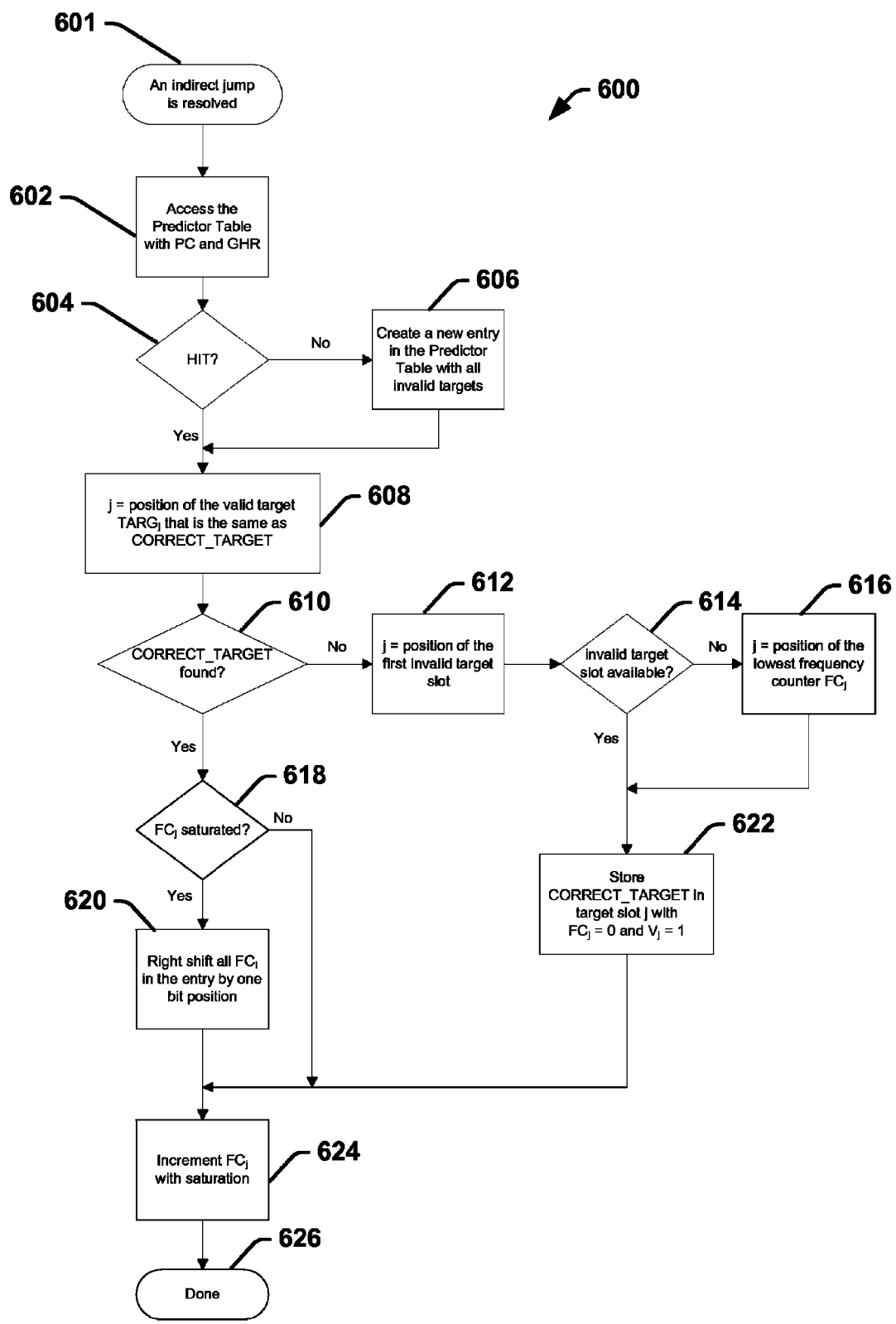
FIG. 6 is a flow diagram of one example of a method for the processing performed to resolve an indirect jump and update an exemplary corresponding prediction engine table by the exemplary computing environment in accordance with the herein described systems and methods.

FIG. 6 is a flow diagram of one example of a method 600 for resolving the prediction of an indirect jump. As is shown in FIG. 6, processing begins at block 601 where an indirect jump is resolved. The prediction engine (e.g., predictor) table is accessed with PC and GHR at block 602. A check is then performed at block 604 to determine whether there was a "hit" with one or more entries found in the prediction engine table. If the check at block 604 indicates that there is no "hit," processing proceeds to block 606 where a new entry in the prediction engine table is created. Additionally, the targets stored in the newly created entry are designated to be invalid (i.e., illustratively, their $V_j$ bits are set to zero). Processing proceeds to block 608 and continues from there.

However, if at block 604 the check indicates that there is a "hit," processing proceeds to block 608 where the target position value j is set to the position of the target in the entry equal to CORRECT_TARGET. A check is then performed at block 610 to determine if the CORRECT_TARGET is found in the prediction engine table. If the check at block 610 indicates that the CORRECT_TARGET is not found, processing proceeds to block 612 where the target position value j is set to the position of the first invalid target slot in the prediction engine table. A check is then performed at block 614 to determine if an invalid target slot is available. If the check at block 614 indicates that there is an available invalid target slot, processing proceeds to block 622 where the CORRECT_TARGET value is stored in target slot j. Concurrently, $FC_j$ is set to zero and $V_j$ is set to one.

However, if at block 614 the check indicates that there is no invalid target slot available, processing proceeds to block 616 where the target position value j is set to the position of the lowest frequency counter $FC_j$. Processing proceeds to block 622 and continues from there.

However, if at block 610, the check indicates that the CORRECT_TARGET value is found, processing proceeds to block 618 where a check is performed to determine if the frequency counter (e.g., $FC_j$) for the identified target is saturated. If the check at block 618 indicates that the frequency counter is saturated for the identified target, processing proceeds to block 620 where the values in the frequency counters for all targets in the identified predictor entry (e.g., all $FC_i$) are shifted by one bit position. Processing then proceeds to block 624.

However, if the check at block 618 indicates that the identified target frequency counter (e.g., $FC_j$) is not saturated, processing proceeds to bock 624 where the identified target frequency counter (e.g., $FC_j$) is incremented with saturation. Processing then terminates at block 626.

In an illustrative operation, the processing of FIG. 6 can operate such that when an indirect jump is resolved, the processor: (1) accesses the predictor with the jump address and the program context; (2) if there is not an entry in the predictor (i.e. the access did not hit in the predictor), creates a new entry with invalid targets; (3) searches the entry for the correct target. If the correct target is not found, it is added to the entry in an invalid target slot, which becomes valid afterwards. If the entry is already full (i.e. all target slots are valid) but the correct target is not in the entry, the new target replaces the target with the smallest frequency counter. The frequency counter associated with a new target is set to zero; and (4) increments the frequency counter of the correct target. Illustratively, this incrementing can be performed using saturating arithmetic. Alternatively, any other kind of arithmetic can be used to change the value of the counter.

The methods can be implemented by computer-executable instructions stored on one or more computer-readable media or conveyed by a signal of any suitable type. The methods can be implemented at least in part manually. The steps of the methods can be implemented by hardware, software, or combinations of software and hardware and in any of the ways described above. The computer-executable instructions can be the same process executing on a single or a plurality of microprocessors or multiple processes executing on a single or a plurality of microprocessors. The methods can be repeated any number of times as needed and the steps of the methods can be performed in any suitable order.

The subject matter described herein can operate in the general context of computer-executable instructions, such as program modules, executed by one or more components. Generally, program modules include routines, programs, objects, data structures, etc., that perform particular tasks or implement particular abstract data types. Typically, the functionality of the program modules can be combined or distributed as desired. Although the description above relates generally to computer-executable instructions of a computer program that runs on a computer and/or computers, the user interfaces, methods and systems also can be implemented in combination with other program modules. Generally, program modules include routines, programs, components, data structures, etc. that perform particular tasks and/or implement particular abstract data types.

Moreover, the subject matter described herein can be practiced with most any suitable computer system configurations, including single-processor or multiprocessor computer systems, mini-computing devices, mainframe computers, personal computers, stand-alone computers, hand-held computing devices, wearable computing devices, microprocessor-based or programmable consumer electronics, and the like as well as distributed computing environments in which tasks are performed by remote processing devices that are linked through a communications network. In a distributed computing environment, program modules can be located in both local and remote memory storage devices. The methods and systems described herein can be embodied on a computer-readable medium having computer-executable instructions as well as signals (e.g., electronic signals) manufactured to transmit such information, for instance, on a network.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing some of the claims.

It is, of course, not possible to describe every conceivable combination of components or methodologies that fall within the claimed subject matter, and many further combinations and permutations of the subject matter are possible. While a particular feature may have been disclosed with respect to only one of several implementations, such feature can be combined with one or more other features of the other implementations of the subject matter as may be desired and advantageous for any given or particular application.

Moreover, it is to be appreciated that various aspects as described herein can be implemented on portable computing devices (e.g., field medical device), and other aspects can be implemented across distributed computing platforms (e.g., remote medicine, or research applications). Likewise, various aspects as described herein can be implemented as a set of services (e.g., modeling, predicting, analytics, etc.).

Figure 7:
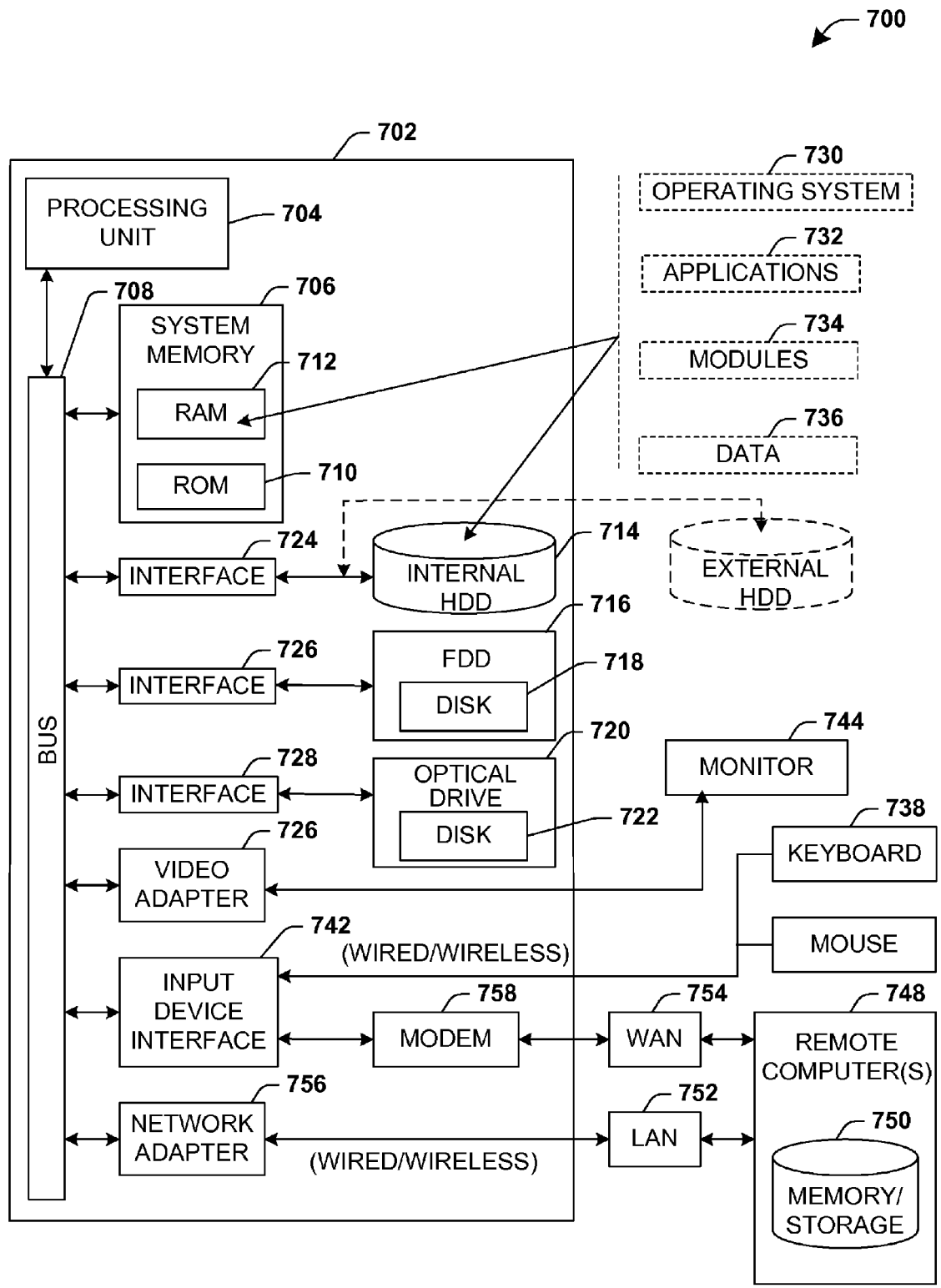
FIG. 7 is an example computing environment in accordance with various aspects described herein.

FIG. 7 illustrates a block diagram of a computer operable to execute the disclosed architecture. In order to provide additional context for various aspects of the subject specification, FIG. 7 and the following discussion are intended to provide a brief, general description of a suitable computing environment 700 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

More particularly, and referring to FIG. 7, an example environment 700 for implementing various aspects as described in the specification includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors. Dual microprocessors and other multi-processor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 includes read-only memory (ROM) 710 and random access memory (RAM) 712. A basic input/output system (BIOS) is stored in a non-volatile memory 710 such as ROM, EPROM, EEPROM, which BIOS contains the basic routines that help to transfer information between elements within the computer 702, such as during start-up. The RAM 712 can also include a high-speed RAM such as static RAM for caching data.

The computer 702 further includes an internal hard disk drive (HDD) 714 (e.g., EIDE, SATA), which internal hard disk drive 714 may also be configured for external use in a suitable chassis (not shown), a magnetic floppy disk drive (FDD) 716, (e.g., to read from or write to a removable diskette 718) and an optical disk drive 720, (e.g., reading a CD-ROM disk 722 or, to read from or write to other high capacity optical media such as the DVD). The hard disk drive 714, magnetic disk drive 716 and optical disk drive 720 can be connected to the system bus 708 by a hard disk drive interface 724, a magnetic disk drive interface 726 and an optical drive interface 728, respectively. The interface 724 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 712, including an operating system 730, one or more application programs 732, other program modules 734 and program data 736. All or portions of the operating system, applications, modules, and/or data can also be cached in the RAM 712. It is appreciated that the specification can be implemented with various commercially available operating systems or combinations of operating systems.

A user can enter commands and information into the computer 702 through one or more wired/wireless input devices, e.g., a keyboard 738 and a pointing device, such as a mouse 740. Other input devices (not shown) may include a microphone, an IR remote control, a joystick, a game pad, a stylus pen, touch screen, or the like. These and other input devices are often connected to the processing unit 704 through an input device interface 742 that is coupled to the system bus 708, but can be connected by other interfaces, such as a parallel port, an IEEE 1394 serial port, a game port, a USB port, an IR interface, etc.

A monitor 744 or other type of display device is also connected to the system bus 708 via an interface, such as a video adapter 746. In addition to the monitor 744, a computer typically includes other peripheral output devices (not shown), such as speakers, printers, etc.

The computer 702 may operate in a networked environment using logical connections via wired and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wired/wireless connectivity to a local area network (LAN) 752 and/or larger networks, e.g., a wide area network (WAN) 754. Such LAN and WAN networking environments are commonplace in offices and companies, and facilitate enterprise-wide computer networks, such as intranets, all of which may connect to a global communications network, e.g., the Internet.

When used in a LAN networking environment, the computer 702 is connected to the local network 752 through a wired and/or wireless communication network interface or adapter 756. The adapter 756 may facilitate wired or wireless communication to the LAN 752, which may also include a wireless access point disposed thereon for communicating with the wireless adapter 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wired or wireless device, is connected to the system bus 708 via the serial port interface 742. In a networked environment, program modules depicted relative to the computer 702, or portions thereof, can be stored in the remote memory/storage device 750. It will be appreciated that the network connections shown are example and other means of establishing a communications link between the computers can be used.

The computer 702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 8:
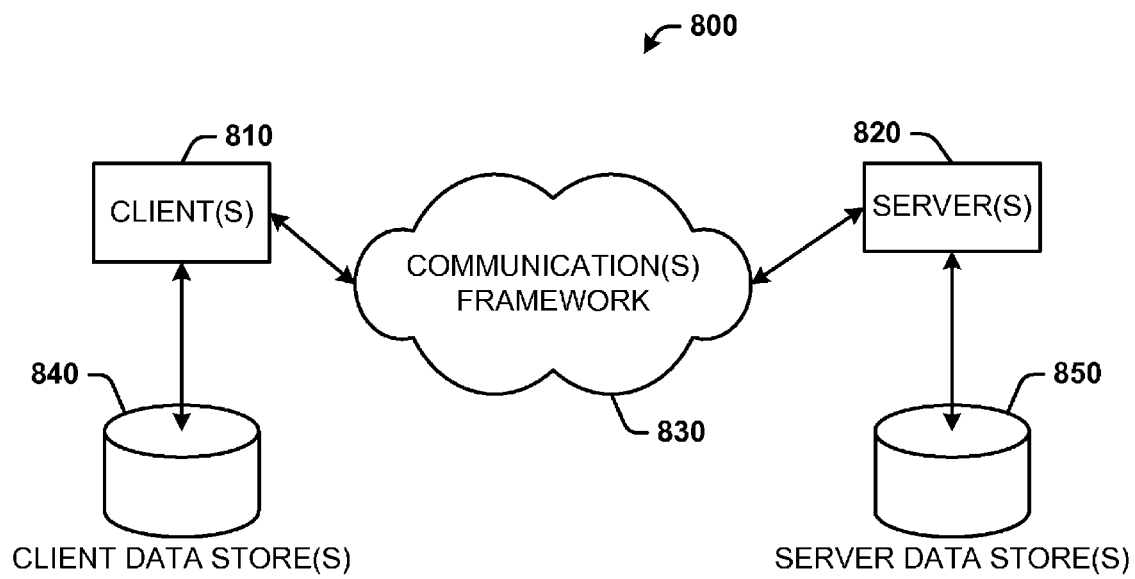
FIG. 8 is an example networked computing environment in accordance with various aspects described herein.

Referring now to FIG. 8, there is illustrated a schematic block diagram of an exemplary computing environment 800 in accordance with the subject invention. The system 800 includes one or more client(s) 810. The client(s) 810 can be hardware and/or software (e.g., threads, processes, computing devices). The client(s) 810 can house cookie(s) and/or associated contextual information by employing the subject invention, for example. The system 800 also includes one or more server(s) 820. The server(s) 820 can also be hardware and/or software (e.g., threads, processes, computing devices). The servers 820 can house threads to perform transformations by employing the subject methods and/or systems for example. One possible communication between a client 810 and a server 820 can be in the form of a data packet adapted to be transmitted between two or more computer processes. The data packet may include a cookie and/or associated contextual information, for example. The system 800 includes a communication framework 830 (e.g., a global communication network such as the Internet) that can be employed to facilitate communications between the client(s) 810 and the server(s) 820.

Communications can be facilitated via a wired (including optical fiber) and/or wireless technology. The client(s) 810 are operatively connected to one or more client data store(s) 840 that can be employed to store information local to the client(s) 810 (e.g., cookie(s) and/or associated contextual information). Similarly, the server(s) 820 are operatively connected to one or more server data store(s) 850 that can be employed to store information local to the servers 820.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system to facilitate processing in a computing environment, comprising:
   a prediction engine table including data representative of N targets of an indirect jump, N a positive integer, and a frequency counter associated with each target;
   a program counter;
   a global branch history register;
   XOR logic configured to XOR the program counter with the global branch history register, to form an index into the prediction engine table;
   a target selection mechanism configured to compare the frequency counters and select a target of the N targets associated with a highest frequency counter value; and
   a hit detection mechanism configured to query the prediction engine table using the index, and
      if the hit detection mechanism detects that there is an entry in the prediction engine table associated with at least a program context, predict the target associated with the highest frequency counter value as the target of the indirect jump, or
      if the hit detection mechanism does not detect that there is an entry in the prediction engine table associated with at least a program context, use branch target buffer prediction to predict the target of the indirect jump, or stall until the indirect jump is executed.

2. The system as recited in claim 1, wherein a frequency counter records a number of times a target was taken in past executions of an observed one or more indirect jumps.

3. The system as recited in claim 1, further comprising a microprocessor pipeline to receive prediction data from the prediction engine table.

4. The system as recited in claim 3, wherein the microprocessor pipeline is configured to fetch a next instruction based at least in part the prediction data.

5. The system as recited in claim 1, wherein the target selection mechanism comprises logic to, if more than one frequency counters have a same highest value, arbitrarily select a target associated with the more than one frequency counters having a same highest value as the target of the indirect jump.

6. The system as recited in claim 1, wherein the prediction engine table is associated with a microprocessor pipeline configured to process an application.

7. The system as recited in claim 6, wherein the indirect jump is executed by the application.

8. The system as recited in claim 1, wherein the prediction engine table comprises a set-associative cache structure.

9. The system as recited in claim 1, wherein the prediction engine table comprises a content addressable associative memory.

10. The system as recited in claim 1, wherein the prediction engine table is operable in a computing environment.

11. A method comprising:
fetching an indirect jump instruction;
accessing a prediction engine table by XOR-ing a program counter with a global history register to form an index into the prediction engine table;
based on the accessing, determining whether the prediction engine table contains a hit indicator corresponding to information about the indirect jump, and
if so, predicting, as a target of the indirect jump, a value in a target slot of the prediction engine table associated with a highest frequency counter value, or
if not, using branch target buffer prediction to predict the target of the indirect jump, or stalling until the indirect jump is executed;
resolving the indirect jump instruction;
accessing the prediction engine table using the index;
determining whether the prediction engine table contains the hit indicator, and
if not, creating a new entry in the prediction engine table to hold a plurality of target slots and associated frequency counters, or
if so, incrementing a frequency counter for a target slot containing a correct address of the indirect jump.

12. The method as recited in claim 11, further comprising determining whether a current valid target slot in the prediction engine table contains the correct address, and if so, incrementing a frequency counter associated with the current valid target slot.

13. The method as recited in claim 12, further comprising determining whether the frequency counter associated with the current valid target slot is saturated, and if so, right-shifting the frequency counter.

14. The method as recited in claim 13, further comprising if the current valid target slot in the prediction engine table does not contain the correct target, determining whether there is an available target slot in the prediction engine table to hold the correct target, and if so, storing the correct target in the available target slot.

15. The method as recited in claim 14, further comprising if there is not an available target slot, storing the correct target in a target slot of the prediction engine table associated with a frequency counter having a lowest value.

16. The method as recited in claim 11, further comprising determining a validity of a value in a target slot.

17. The method as recited in claim 16, further comprising if the value is determined to be valid, setting a corresponding bit indicator.

18. The method as recited in claim 11, further comprising communicating an address of the predicted target to a microprocessor pipeline or a cooperating computing application.

19. The method as recited in claim 11, further comprising performing the incrementing using saturation arithmetic.

20. A computer-readable storage medium storing instructions to perform a method according to claim 11.

* * * * *